UNITED STATES PATENT OFFICE.

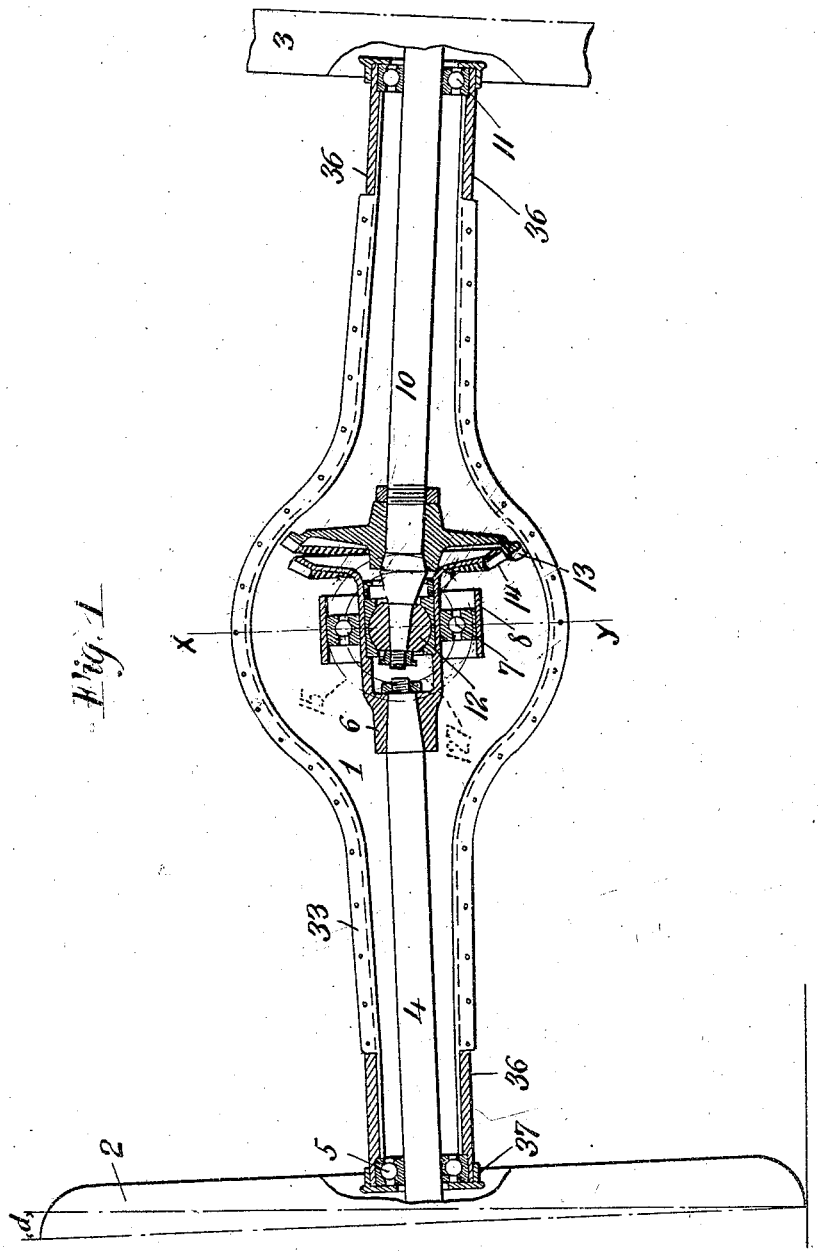

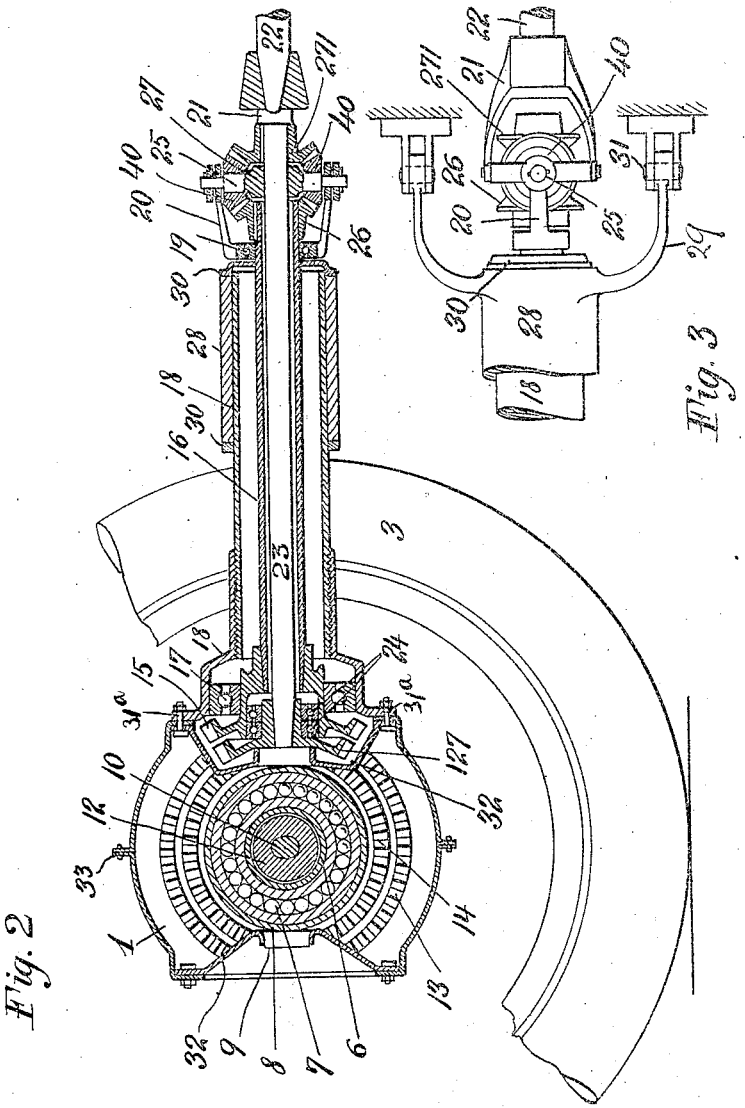

GIOVANNI AGNELLI, OF TURIN, ITALY, ASSIGNOR, BY MESNE ASSIGNMENTS, TO F. I. A. T., OF POUGHKEEPSIE, NEW YORK, A CORPORATION OF NEW YORK.

MOTOR-VEHICLE AXLE.

1,050,050. Specification of Letters Patent. Patented Jan. 7, 1913.

Original application filed January 16, 1907, Serial No. 352,630. Divided and this application filed December 15, 1909. Serial No. 533,149.

*To all whom it may concern:*

Be it known that I, GIOVANNI AGNELLI, a subject of the King of Italy, residing at Turin, Italy, have invented certain new and useful Improvements in Motor-Vehicle Axles, of which the following is a full, clear, and exact specification.

This invention relates to vehicle axles, and has particular reference to shaft propelled vehicles comprising a motor, driving mechanism, and road wheels.

The object of the invention is to provide improvements in the driving axle construction, whereby the driving wheels may be splayed, as well as to provide a rigid axle construction dispensing with the use of tie rods. This result I attain by constructing an axle of dished and flanged segmental stampings secured together along the flanges, whereby the dished conformation and the flanges coöperate to form a very rigid and light wheel carrying structure, and at the same time form a complete housing for the differential and live shafts.

Further objects of the invention reside in the construction and combinations of the various parts, all of which will more fully appear in connection with the following description of the accompanying drawings, wherein—

Figure 1 is a rear elevation of a vehicle embodying the invention: Fig. 2 is a longitudinal section showing the transmission shafts, and Fig. 3 is a detail of the differential and the construction for transmitting the thrust to the frame.

Hinged horizontally on the frame at 31 is a yoke 29 having its hub 28 rotatably journaled between thrust collars 30 on reach rod tube 18, which latter is bolted to the rear axle 1, thus permitting the rear axle and associated parts to swing vertically about the pivots 31 and to oscillate with inequalities in the road on the axis of tube 18.

22 is the engine or driving shaft leading from the change gear (not shown) and carries at its rear end yoke 21 connected to diametrical parts of the Cardan joint spider 27 in the same plane as the pivots 31. At right angles thereto is pivoted a yoke 20 having a ball thrust bearing 19 on the hollow shaft 16 to resist the back thrust of the bevel pinions. Diametrically journaled on the spider 27 at 25 are differential pinions 40 which mesh respectively with bevel gear 26 on hollow shaft 16 and bevel gear 271 on shaft 23. It will thus be seen that a universal or Cardan connection is provided between shaft 22 and shafts 16 and 23, and at the same time there is provision for differential driving between shaft 22 and shafts 16 and 23. The shaft 16 has a thrust bearing 17 in the tubular reach rod 18, and has keyed at the rear end a bevel driving gear 15. The shaft 23 is similarly journaled in thrust bearings 24 between the hub of bevel gear 127 and that of gear 15, so that both of these shafts are journaled in the reach rod casing 18, and also independently to permit differential movement.

The entire driving gearing to the wheels is incased, and to this end, the tubular casing 18 is attached at one end to the front flanged half of the rear axle 1 by bolts 31ª, and at the front end is rotatably held between the thrust collars 30 by yoke 29, pivoted, as before stated, on the frame at 31, and in the same plane as the universal joint. Without the rotatable bearing of reach rod tube 18 in hub 28, the pivots 31 might be sheared off by one rear wheel being raised above the other in going over obstructions. By this construction the thrust and strains due to obstructions will be transmitted directly to the frame through the yoke, and not through the differential and universal joint to the frame. Meshing with the concentric gears 15 and 127, are gears 13 and 14, respectively driving the live shafts 10 and 4, and thereby the wheels 3 and 2, respectively.

11, and 5, are bearings for the wheel ends of the live shafts carried by the flanged and dished segments 1, 1, of the axle. Journaled in trunnions 9 in cone-shaped plates 32 carried by the axle halves 1, is a ring 8, the axis of the trunnions being coincident with that of the shafts 16, 23. The hub 6 of gear 14 is journaled in ring 8 at bearing 7, and within hub 6 in a spherical block 12 is journaled the end of shaft 10, the horizontal axis of block 12 being also coincident with that of the trunnions 9. Thus it will be seen that the angle of the shafts 10 and 4 can be varied as desired without loss of power through universal joints, and at the same time the ends of shafts 10 and 4 will be universally driven, and their thrusts ultimately taken up by the trunnions 9 and the axle halves 1, 1, through block 12, bearing 7 and ring 8. Thus it is possible to drive splayed wheels from one differential coupling, and without loss of power through universal joints, while at the same time, the differential is removed from the rear axle to the frame.

An important feature of the invention resides in the construction of the rear axle 1 herein described out of two stamped plates having flanges 32 bolted together preferably vertically through the flanges, whereby the flanges 32 in combination with the dished formation of the segments prevent distortion or bending of the axle, and entirely obviate the use of tie rods. By such a construction, the cost of production is reduced, as well as the weight, and much greater strength and rigidity obtained. Also, adjacent the ends of the axle 1, will be secured the usual rear springs for supporting the body (not shown). As shown in Fig. 1, the flanges are cut away near the ends of the segments, and collars 26 secured on the outside of the segments. The stationary ball race of bearings 5 and 11 are held inside these collars and against the ends of the segments 1 by screw caps 27 threaded on collars 26.

It is thought that the operation of the mechanism will be obvious from the description, and that no further explanation is necessary. By this invention, the driven wheels can be splayed as much as may be desired, without requiring universal joints between the live shafts and their respective wheels. A driving axle constructed as herein described of two flanged and dished plates secured together, will be exceptionally rigid and strong in proportion to its weight, and besides maintaining alinement, completely houses the driving mechanism, protecting it from dirt and from damage by striking obstructions.

This application is a division of my application filed January 16, 1907, Serial Number 352,630, for driving gear of motor road vehicles, wherein I claim the novel combinations of gearing, this application being restricted to the axle and housing construction more especially useful in motor driven road vehicles, irrespective of the particular system of gearing used.

I claim—

1. An axle for motor vehicles divided into two intermediately enlarged longitudinally channeled halves to contain driving gearing, formed of pressed sheet metal and each having vertically arranged stiffening flanges along their meeting edges, and fastening means passing through said flanges, said axle being adapted at said intermediate portion to support a propeller shaft.

2. In a motor vehicle, a three part hollow driving axle and propeller shaft housing comprising two longitudinally divided flanged halves formed of pressed sheet material, said halves being enlarged intermediate their ends and being secured to each other at the flanges, and a propeller shaft housing secured to the enlarged portion of one of said flanged halves.

3. An axle formed of two members each having an enlarged hollow gear case portion within the same intermediate its ends, one of said members having an opening therethrough with a flange surrounding said opening, a tubular reach rod and propeller shaft housing secured to said member by said flange, and external flanges on said members for longitudinally connecting said members together and stiffening the assembled structure.

In testimony, whereof I affix my signature, in presence of two witnesses.

GIOVANNI AGNELLI.

Witnesses:
PIERO GIANOLIO,
LUCIANO ATTILIO.